Patented Jan. 22, 1946

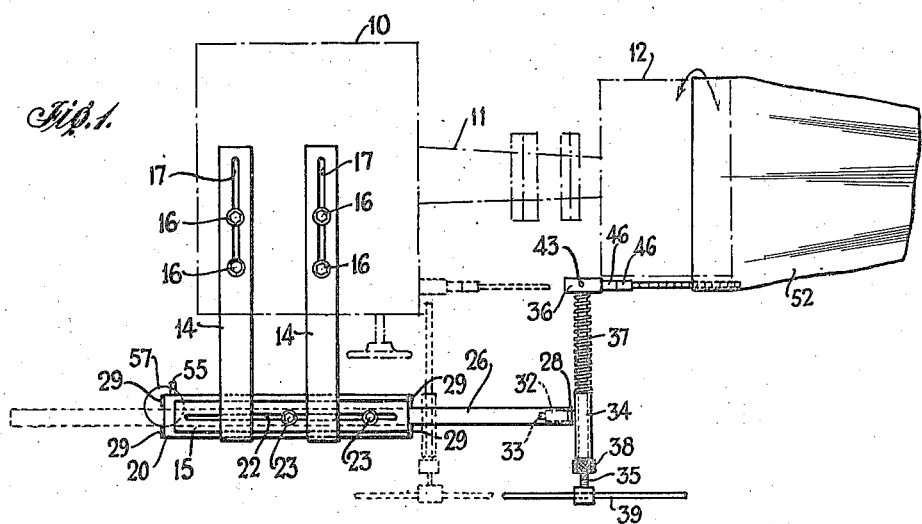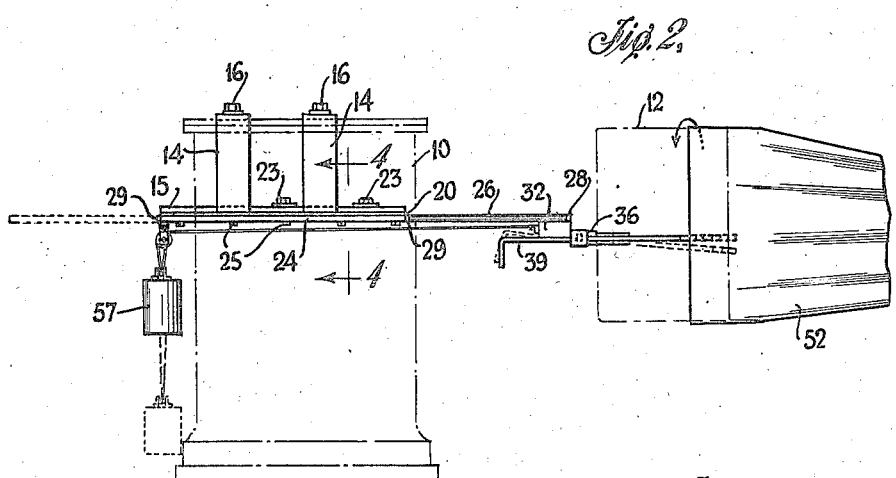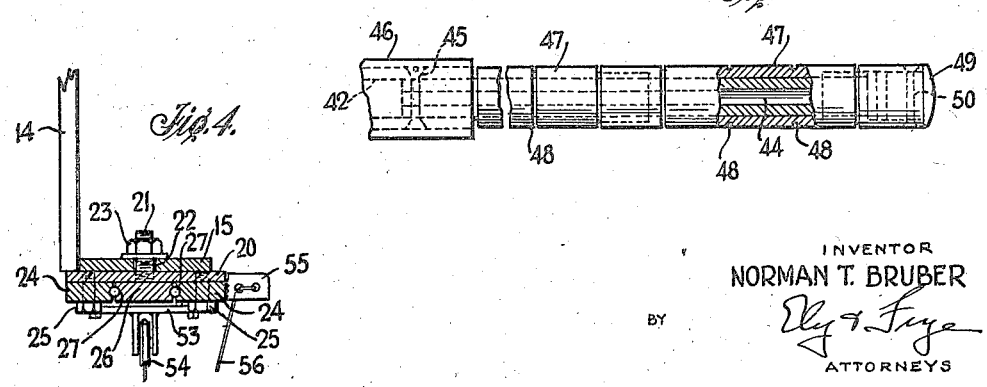

2,393,506

UNITED STATES PATENT OFFICE 2,393,506

BAND-PLY APPLYING DEVICE

Norman T. Bruber, Los Angeles, Calif., assignor to The Firestone Tire & Rubber Company, Akron, Ohio, a corporation of Ohio Application May 23, 1945, Serial No. 595,469

7 Claims. (Cl. 154—10)

This invention relates to tire building apparatus and more especially it relates to mechanism for mounting annular bands of rubberized tire fabric upon tire building drums in the manufacture of pneumatic tire casings.

Before the advent of the "flat band" method of manufacturing pneumatic tire casings, tires were built upon collapsible cores having general torus shape. At that time tire fabric was formed into anular bands, usually of two plies, of somewhat smaller diameter than the peripheral diameter of the core, and mounted in circumscribing relation to the latter by stretching it thereover. But this practice did not lend itself readily to the manufacture of tire casings upon rotatable drums. Accordingly the tire-building technique was changed, and tire fabric was mounted upon the drum one ply at a time, the fabric being drawn from conveniently adjacent supply rolls comprising long lengths of fabric of different widths and bias. The labor of building the tires is arduous. It requires men of large stature and ample strength, the work being too heavy for female operatives.

Due to war time conditions, there is at the present time a scarcity of capable men available for the building of tires. There are, however, plenty of women workers available who are capable of performing light operations. To provide for the employment of female labor in the manufacture of pneumatic tire casings required a change in the tire-building process. It was found that the constructing of endless tire bands of two or more plies of rubberized fabric could easily be accomplished by female operators, and that the use of such bands in the manufacture of drum-built tires was economically advantageous provided the bands could be mounted upon the drums in a simple and facile manner. It is to the solution of this problem that this invention primarily is directed.

The chief objects of the invention are to provide apparatus for mounting annular bands of tire-building material upon tire building drums; to provide apparatus of the character mentioned that readily is moved between operative and inoperative positions, in the latter of which the drum is unobstructed so that other operations may be performed thereon; and to provide apparatus of the character mentioned that may be controlled by the operator to meet various conditions that may arise. More specifically the invention aims to enable the employment of female labor in performing light operations incidental to the building of tires; and to so lighten the labor of tire building that men of smaller stature and less strength may be employed therefor. Other objects will be manifest as the description proceeds.

Of the accompanying drawing:

Fig. 1 is a plan view of a band-placing device embodying the invention, a tire building machine with which the device is operatively associated being indicated in dot and dash lines;

Fig. 2 is a side elevation of the apparatus shown in Fig. 1;

Fig. 3 is a detail view, on a larger scale, of the work-engaging portion of the device of the invention, a part thereof being broken away and a part being in section; and Fig. 4 is a section on the line 4—4 of Fig. 2.

Referring to the drawing, there is indicated at 10 the housing of a conventional or preferred tire building machine, which machine includes a driving spindle 11 projecting laterally from one side thereof and a rotatable tire building drum 12 on the outer end of said spindle. Beadsetting devices, fabric stitchers, tread stitchers, stock racks and other mechanisms appurtenant to tire building machines constitute no part of the present invention and are omitted from the drawing.

The band-placing device embodying the invention is carried by housing 10 of the tire building machine, and comprises a pair of angular bracket arms 14, 14 that are mounted upon the top of the housing 10 and overhang the front wall thereof, the outer end portions of said arms extending vertically downwardly and having an elongate horizontally disposed plate 15 integrally joined to their lower ends. The bracket arms 14 are secured to the housing 10 by bolts 16, 16 that extend through respective slots 17 in said arms 14, the arrangement being such that the proximity of the plate 15 to the front of the housing may be adjusted to suit different conditions, for example, different sizes of drums 12. The plate 15 is disposed parallel to the axis of the spindle 11 and drum 12, and is substantially in the same horizontal plane as said axis.

The bracket plate 15 carries a supporting plate 20 that is flush against the under face thereof, said supporting plate having a pair of upstanding, spaced apart threaded studs 21, 21 that project through an elongate slot 22 formed in the plate 15 and extending longitudinally thereof, there being nuts 23 on said studs for retaining the supporting plate in place. The arrangement is such that the supporting plate 20 is adjustably positionable longitudinally of plate 15.

Mounted flush against the bottom face of the supporting plate 20, at each side thereof, are respective slide-guides 24, 24 that are secured to the supporting plate 20 by cap screws 25. Positioned between the guides 24 is a slide 26 the lateral margins of which are formed with respective longitudinally extending grooves. The confronting marginal faces of the guides 24 are similarly grooved whereby are provided raceways, there being a plurality of ball bearings 27 in each raceway. The arrangement is such that the slide 26 is supported by the ball bearings 27, and thereby enabled to move longitudinally relatively of the guides 24 and supporting plate 20. Ball-retainer plates, such as the plate 28, are mounted on opposite ends of the slide 26 so as to close the open ends of the ball race therein, and retainer plates 29, 29 are mounted on opposite ends of the slide-guides 24 for the same purpose, whereby the balls 27 are retained in their raceways.

Mounted upon the under side of the forward end of the slide 26, which is the end nearest the drum 12, is a bearing block 32 in which is journaled a spindle 33 that is secured to and projects laterally at right angles from a holder or sleeve 34. Journaled in the latter for axial and angular movement therein is a rod 35, and on one end of the said rod 35, adjacent the drum 12, is fixedly mounted a sleeve 36 that is disposed perpendicular thereto. Mounted upon the rod 35 between one end of sleeve 34 and the sleeve 36 is a helical compression spring 37 that normally urges the rod in the direction of said sleeve 36, which movement of the rod is limited by an adjustable stop nut 38 that is threaded onto the opposite end portion of said rod and adapted to abut the other end of sleeve 34. By means of the nut 38 the proximity of the sleeve 36 to the drum 12 is controlled, whatever the diameter of said drum, the said sleeve being closely adjacent but not in contact with the drum. On the extremity of the rod 35, outwardly of the nut 38, is an operating handle 39 by means of which the rod 35 may be manipulated to turn it angularly, or to draw it outwardly, i. e., away from the drum 12, if desired.

Within the sleeve 34 and extending axially from one end thereof is a tubular bearing 42, Fig. 3, that is secured to said sleeve by the pin 43, Fig. 1. Mounted within the bearing 42 and projecting from the projecting end of the latter is an elongate hollow cylindrical shaft 44, which shaft is non-rotatably secured to the bearing 42 by a rivet 45. Journaled on the projecting portion of the bearing 42 is a pair of collars 46, 46, and journaled on the shaft 44 is a series of cylindrical rollers 47, 47, each of the latter being formed with a plurality of axially-spaced circumferential grooves 48, 48. The roller 47 at the free end of the shaft 44 extends beyond the end of the latter, and has its open end closed by a rounded cap 49 secured in place by a pin 50. The arrangement is such that the collars 46, rollers 47 and end cap 49 are free to rotate about a common axis, and that such axis may be parallel to the axis of the drum 12, as shown in full lines in Figs. 1 and 2, or at an angle thereto, as shown in broken lines in Fig. 2, under the control of the operator who manipulates the handle 39.

Collectively, the rotatable members 46, 47 and 49 constitute a tool by means of which the mounting of an annular band of rubberized fabric 52 upon the drum 12 is facilitated. Because said tool is supported by the slide 26, it is operatively positionable adjacent the drum, as shown in full lines in Fig. 1, or may occupy the inoperative position shown in broken lines in the same figure, means being provided for urging said tool normally toward said inoperative position. To this end a bracket 53 is secured to the underside of the guides 24, at the rear extremity thereof, spanning the slide 26 in spaced relation thereto, said bracket having a pulley 54 journaled therein. An anchor plate 55 is attached to one of the guides 24, at the rear extremity thereof, said plate projecting laterally from said guide and formed with a pair of apertures through which one end of a cable 56 is passed and tied, to anchor said cable thereto. The cable 56 extends over the pulley 54 and has its opposite end secured to the bearing block 32 at the forward end of the slide 26, said cable being formed with a bight between the anchor plate 55 and pulley 54, in which bight a counterweight 57 is suspended. The arrangement is such that the counterweight 57 normally urges the slide 26 rearwardly to retracted, inoperative position, as indicated by the broken lines in Fig. 1.

In the operation of the invention, the slide 26 and mechanism carried thereby normally are maintained in retracted, inoperative position by the counterweight 57. With the slide so positioned, and the tire building drum 12 stationary, the operator starts a tire band 52 onto the outer end of said drum. Usually the drum is wrapped with a liner of non-tacky fabric before the band 52 is started thereon. After the band is positioned on the drum substantially to the extent indicated in the drawing, the operator grasps the handle 39 and pulls the slide 26 outwardly toward the drum 12, and inserts the free end of the elongate rotatable tool, that comprises the rollers 47, beneath the adjacent lateral marginal portion of the band 52, the latter being stretchable so as readily to admit the tool. The operator then starts the rotation of the drum 12, and by means of the handle 39, tilts the work-engaging tool so that its axis is at a slight angle to the axis of the drum, the tool being inclined downwardly from the axis of rod 35. Rotation of the drum is in the direction indicated by the arrows in Figs. 1 and 2, so that the fabric of the band 52 moves downwardly over the work-engaging tool. The result of the movement of the work-fabric over the obliquely disposed rollers of the tool is to impart a progressive axial movement to the tire band. The operation is continued until the band reaches the desired position upon the drum, at which position the tool is substantially covered by the band. The operator then stops the drum, and moves the tool axially of the drum to withdraw it from the tire band, the counterweight 57 then restoring the tool to its normal inoperative position. The operator may then remove the liner from beneath the mounted band, thus completing the band-mounting operation.

The apparatus is of relatively simple construction, and may be employed in the manufacture of tires of various sizes. It enables smaller men to perform tire building operations that previously required mean of greater stature and strength, and achieves the other advantages set out in the foregoing statement of objects.

Modification may be resorted to without departing from the spirit of the invention or the scope thereof as defined by the appended claims.

What is claimed is:

1. A device for mounting endless fabric bands on the rotatable drums of tire building machines, said device comprising a slide positioned beside the tire building machine and manually reciprocable parallel to the axis of the rotatable drum thereof, a holder perpendicular to the slide swiveled on the end of the latter nearest the drum, a rod journaled in the holder for axial and angular movement therein, and an elongate cylindrical tool carried by said rod at the end thereof nearest said drum, said tool being perpendicular to said rod and rotatable on its own axis.

2. A combination as defined in claim 1 whereof the tool comprises a plurality of individual rollers journaled end to end on an axial shaft.

3. A combination as defined in claim 1 whereof the tool is formed with a plurality of spaced apart circumferential grooves.

4. A device for mounting endless fabric bands on the rotatable drums of tire building machines, said device comprising a slide positioned beside the tire building machine and movable parallel to the axis of the tire building drum, a holder perpendicular to the slide swiveled on the end of the latter nearest the drum, a rod journaled in the holder for axial movement therein, an elongate tool perpendicular to the rod carried thereby at one end thereof, and yielding means urging said rod in the direction of said tool to a determinate position with relation to said holder.

5. A combination as defined in claim 4 whereof the last mentioned means is a compression spring mounted on the rod between the tool and the holder, and stop means adjustably mounted upon the opposite end portion of the rod.

6. A device for mounting endless fabric bands on the rotatable drums of tire building machines, said device comprising a slide positioned beside the tire building machine and manually movable parallel to the axis of the tire building drum to an operative position, means normally urging the slide to a retracted inoperative position, a holder swiveled on an end of the slide and revolvable in a plane perpendicular thereto, a rod journaled in the holder for axial and angular movement therein, an operating handle on one end of said rod, and a tool extending radially from the opposite end of said rod.

7. A combination as defined in claim 6 including means mounting the slide upon the tire building machine, and means for adjusting the position of the slide with relation to said slide mounting means.

NORMAN T. BRUBER.